United States Patent [19]
Nony

[11] 4,235,150
[45] Nov. 25, 1980

[54] EXPANSIBLE ANCHOR PLUG

[76] Inventor: Jean-Claude Nony, Les Clairieres 125 avenue de Flandre, 59290 Wasquehal, France

[21] Appl. No.: 733,273

[22] Filed: Oct. 18, 1976

[30] Foreign Application Priority Data

Oct. 16, 1975 [FR] France ............................... 75 31671

[51] Int. Cl.$^3$ .............................................. F16B 13/06
[52] U.S. Cl. ....................................................... 85/84
[58] Field of Search ................... 85/84, 83, 82, 85, 21; 151/41.73

[56] References Cited
U.S. PATENT DOCUMENTS 777,134  12/1904  Palmer ..................................... 85/84

FOREIGN PATENT DOCUMENTS

| | | | |
|---|---|---|---|
| 692861 | 8/1930 | France | 85/83 |
| 1300817 | 7/1962 | France | 85/83 |
| 1315418 | 12/1962 | France | 85/83 |
| 335508 | 9/1930 | United Kingdom | 85/84 |
| 1358223 | 7/1974 | United Kingdom | 85/84 |

*Primary Examiner*—Ramon S. Britts
*Attorney, Agent, or Firm*—Brisebois & Kruger

[57] ABSTRACT

Expansible anchor plug made of a thermoplastic material consists of a segment of a pyramid having a square section, which is pierced by an axial hole. Two opposed intersections between contiguous sides of the pyramid are transversely notched, and a slot lying in an axial plane leads away from the smaller end of the plug.

7 Claims, 8 Drawing Figures

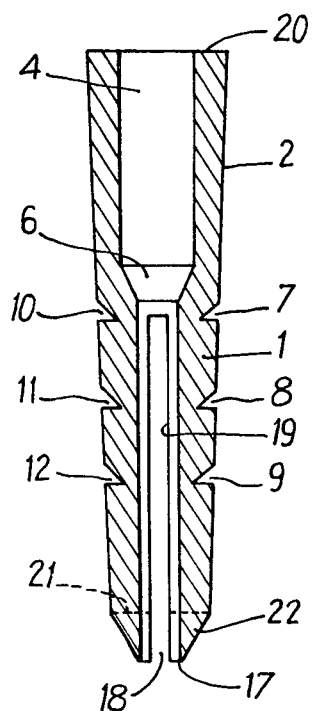
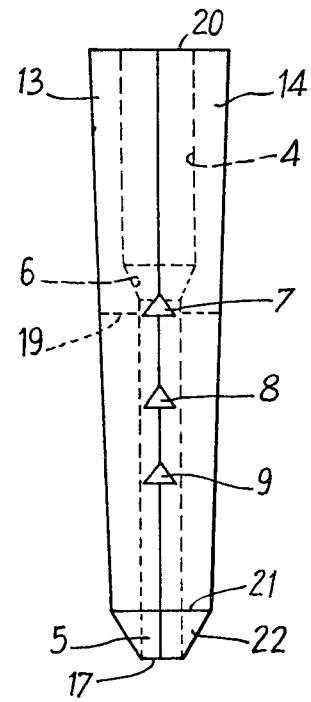
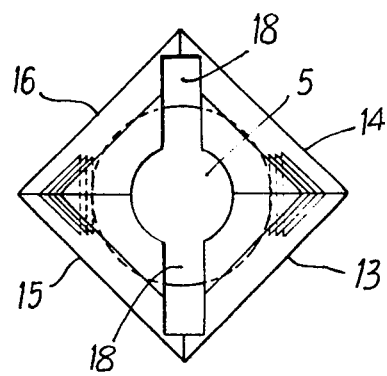
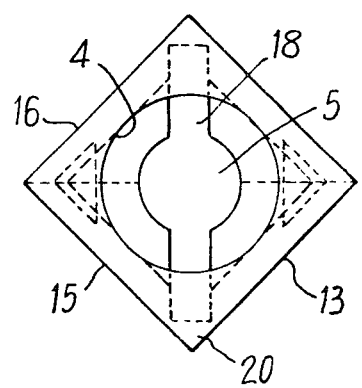

EXPANSIBLE ANCHOR PLUG

SUMMARY OF THE INVENTION

This invention relates to an anchor plug.

It is customary, when fastening screws in materials in which threads cannot be formed, to pierce a hole in that material which has a diameter greater than that of the screw. An anchor plug is then introduced into the hole, which plug consists of a hollow tube into which the screw is subsequently introduced. During the tightening of the screw the material of the plug is compressed between the screw and the walls of the hole in which the plug is located. The pressure exerted by the plug on these walls prevents any subsequent displacement of the plug and thus of the screw along the axis of the hole, so that the screw is firmly attached.

Expansible anchor plugs are generally slit axially over a portion of their length, beginning at the end which is to occupy the bottom of the hole. This facilitates the penetration of the plug into the hole, while likewise facilitating the deformation of the slit end of the plug, so that screwing produces sufficient pressure by the plug against the wall of the hole, even in the case of that part of the plug corresponding to the point of the screw.

The known expansible anchor plugs are primarily designed to be adapted for introduction into a circular drilled hole. But the drilled hole is, in practice, rarely exactly circular, so that the known expansible plugs are not well adapted to such irregular holes and the screw is thus less firmly anchored than it should be. This is particularly the case when the screws are anchored in concrete, because a hole bored with percussion does not generally have the desired circular form.

Moreover the known plugs are intended to fit only a hole of predetermined diameter so that in order to cover a substantial range of hole diameters, it is necessary to provide a substantial number of plugs having corresponding diameters.

It is the purpose of the present invention to eliminate these disadvantages and to provide an expansible plug which is capable of adapting itself to irregular holes, with one plug being usable in holes having a considerable range of diameters.

It is therefore the object of the invention to provide an expansible anchor plug consisting of a body having an elongated shape and a longitudinal hole, which plug has, over part of its length, transverse notches formed on two contiguous lateral faces symmetrically with respect to their line of intersection characterized by the fact that the body, which is made of a thermoplastic material, has substantially the shape of a segment of a pyramid having a square section and is slit for part of its length along an axial plane.

The major base and the minor base of the segment of the pyramid each lie in a plane perpendicular to the axis of the plug.

The longitudinal hole adapted to receive the screw preferably has a smaller diameter near the end adapted to receive the tip of the screw then at the end adapted to receive the head of the screw. For this purpose the longitudinal hole may, for example, comprise at least two sections in alignment with each other, both substantially circular, and having the same axis of symmetry as that of the plug, the section of the hole terminating at the major base of the pyramid segment having a larger diameter than the section of the hole terminating at its minor base.

Generally the notches extend on each of two contiguous lateral faces over a width corresponding to half the width of said lateral faces at the point at which the notch in question is located.

The depth of the notches is preferably less than the thickness of the thermoplastic material at the point under consideration. In other words, the depth of the notch is less than the thickness of the thermoplastic material between the longitudinal hole and the external surface of the body of the plug at the point at which the notch in question is located.

The anchor plug according to the invention comprises a slot extending over part of its length and lying in an axial plane. Generally the slot is formed by the removal of material so that the parts of the body opposite each side of the slot are not in contact with each other. In the following description, the minimum distance separating these two opposite parts will be referred to as the "width" of the slot.

Generally speaking the anchor plug according to the invention is slotted over a part of its length beginning at the minor base of the pyramid segment which constitutes the body of the plug. Preferably the slot is formed in a plane containing two opposed corners of the pyramid segment. In other words, the plane of the slot cuts diagonally across the major base and minor base of the pyramid segment.

Preferably the width of the slot is less than the diameter of the longitudinal hole in the plug, the width of the slot being less than the diameter of the smallest segment of the hole when the hole consists of several hole sections (at least two as indicated above) in alignment with each other, with one smaller in diameter than the other.

In general, the plug is slipped over a length equal to half, or at most two-thirds, of its entire length.

Of course, it is not generally useful to form transverse notches across the two opposite corners intersected by the slot. Only the two other corners comprise notches such as those hereinafter described.

The expression "corner" as employed herein does not necessarily indicate that the junction of two continuous lateral faces of the pyramid segment is necessarily constituted by a sharp corner. It may also consist of a rounded corner or preferably a beveled corner.

In the latter case the junction between the contiguous lateral faces may consist, for example, of a triangular bevel the most acute angle of which is found at the major base of the pyramid segment. The base of the triangle remote from the most acute angle is small in proportion to the distance between the acute angle and the minor base so that the triangle has an elongated form. In a preferred embodiment the most acute angle of the triangle is positioned adjacent the major base of the segment of the pyramid.

While the ends of the anchor plug according to the invention may both be planar sections, delimited by a square, perpendicular to the base of the plug, and hereinafter called major base and minor base, the end of the body of the plug at the minor base may have a different shape. It may comprise, for example, a second pyramidal segment having a square section the major base of which corresponds with the minor base of the first segment, that is to say, the principal part of the body of the plug, the height of the second pyramidal segment being small in proportion to the height of the first pyramidal segment, and the angle at the summit of the pyramid constituting the second segment being greater than the angle at the summit of a pyramid corresponding to the first segment.

For example, the angle between two opposite corners of the pyramid corresponding to the first segment (principal part of the body of the plug) may vary between 0.5° and 5°, and especially between 1° and 4°. The angle between two opposed corners of the pyramid corresponding to the second pyramid segment may vary, for example, between 50° and 120°.

As indicated herein the anchor plug according to the invention is made by injection molding.

It has been found that by making the anchor plug according to the invention from a material consisting of a mixture of polyethylene and polypropylene, a plug is obtained having particularly valuable properties with respect to flexibility and resistance to both tearing and crushing.

Certain specific embodiments of the invention will now be described in greater detail with reference to the accompanying drawings, in which:

FIG. 1 is an axial sectional view taken through a first embodiment of the plug;

FIGS. 2, 3 and 4 are elevational, bottom plan, and top plan views of the embodiment of FIG. 1;

Figure 5:
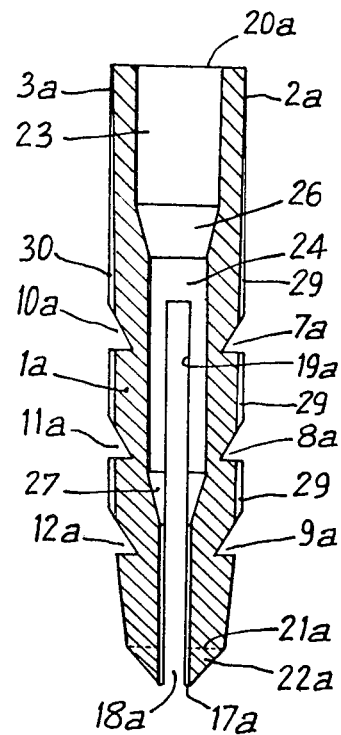
FIG. 5 is an axial sectional view taken through a second embodiment of the plug.

FIGS. 3 and 4, on the one hand, and 7 and 8, on the other hand, have been drawn on a larger scale than FIGS. 1 and 2, on the one hand, and 5 and 6 on the other hand.

Referring now to FIGS. 1–4, the body of the plug 1, injection molded from a material consisting of a mixture of polyethylene and polypropylene, is pierced by a longitudinal hole comprising two circular sections 4 and 5, the diameter of section 4 being greater than the diameter of section 5. The two hole sections 4 and 5 are located in alignment with each other and connected by a frusto-conical opening 6.

Notches 7, 8, 9, 10, 11 and 12 are formed on the corners 2 and 3, and near these corners. The notches 7, 8 and 9 are formed at the intersection and near the intersection between the lateral surfaces 13 and 14. The notches 10, 11 and 12 are formed at the intersection and in the neighborhood of the intersection between the lateral surfaces 15 and 16.

A slot 18 is formed along a plane perpendicular to the plane of FIG. 1, extending from the base 17 substantially to the height of the notch 7. The top of the slot is indicated in FIG. 2 by the broken line 19. The principal part of the body of the plug consists of a pyramidal segment positioned between the major base 20 and the minor base 21. The body of the plug terminates in a second pyramidal segment 22 having a larger summit angle, the major base of which is 21 and the smaller base of which is 17.

Figure 6:
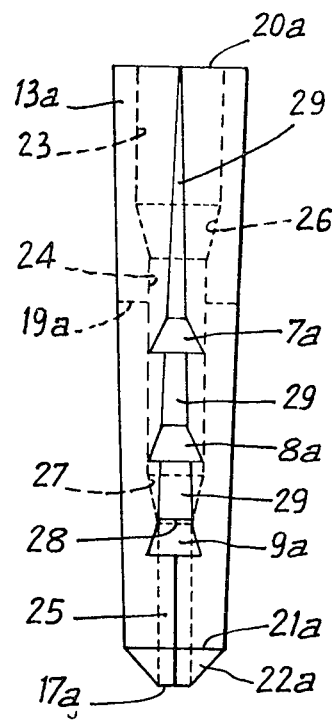
FIGS. 6, 7 and 8 are respectively, elevational, bottom plan, and top plan views of the embodiment of FIG. 5.
Figure 7:
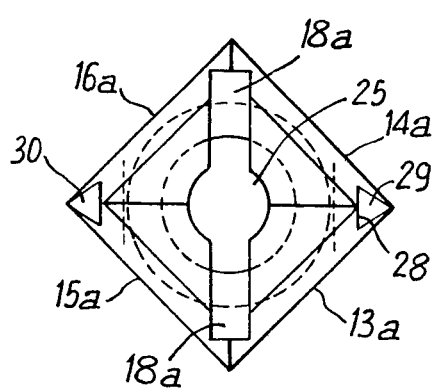
Figure 8:
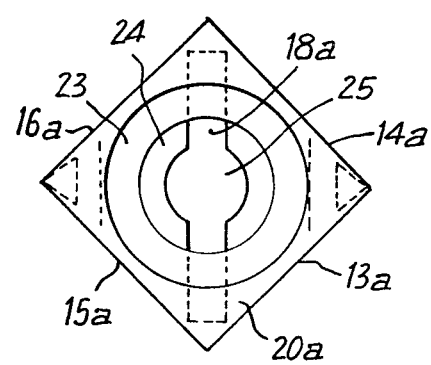

FIGS. 5 and 8 show a plug having substantially the same characteristics as the plug shown by FIGS. 1–4. All the analogous elements common to the two plugs have been designated on FIGS. 5–8 by the same reference numeral as in FIGS. 1–4, plus the letter "a". A difference over the plug of FIGS. 1–4 resides in the fact that the longitudinal hole consists in this case of three circular hole sections 23, 24 and 25, of decreasing diameter, connected by frusto-conical parts 26 and 27. Moreover, the intersection between the lateral surfaces 13a and 14a on the one hand and 15a and 16a on the other hand is not formed by a sharp corner except near the major base 28. In effect, the intersection between the lateral surfaces 13a and 14a comprises a triangular bevel 29, the sharpest angle of which is positioned at the intersection of 2a with the major base 28. The base of this triangle is represented by 28 on FIGS. 6 and 8. In reality the continuity of the triangle 29 is interrupted by the notches 7a, 8a and 9a, as appears on FIGS. 5 and 6. Likewise, the intersection between the lateral faces 16a and 18a has a triangular bevel represented by 30 on FIG. 7 and analogous to the triangular bevel 29.

What is claimed is:

1. In an expansible anchor plug comprising an elongated body having a square section and axially pierced by a longitudinal hole, said plug having over part of its length transverse notches formed on two contiguous lateral faces symmetrically with respect to their intersection, the improvement according to which the body is made of a thermoplastic material, has substantially the shape of a segment of a pyramid having a square section, and formed with a slot extending over part of its length and lying in an axial plane.

2. Anchor plug as claimed in claim 1 in which the slot lies in a plane containing two opposite corners of said plug.

3. Anchor plug as claimed in claim 1 in which the width of the slot is less than the diameter of the longitudinal hole in the plug.

4. Anchor plug as claimed in claim 1 in which the slot in the plug extends for a distance at least equal to half and at most equal to two-thirds of the length of the plug.

5. Anchor plug as claimed in claim 1 in which the end of the body of the plug has the form of a pyramidal segment of square section, the major base of which coincides with the minor base of the pyramid segment constituting said body, the height of the pyramid segment constituting the end of the body being small as compared with the height of the pyramid segment constituting the body proper, the angle at the summit of the pyramid segment constituting the end of the body being larger than the angle of the summit of a pyramid corresponding to the pyramid segment constituting the body.

6. Anchor plug as claimed in claim 1 in which the longitudinal hole of the plug consists of at least two whole sections in alignment with each other, each substantially circular, and having the same axis of symmetry as that of the plug, the section of the hole opening into the major base of the plug having a larger diameter than the section of the hole opening at the other end of the plug.

7. Anchor plug as claimed in claim 1 made of a material which is a mixture of polyethylene and polypropylene.

* * * * *